United States Patent [19]
Duey et al.

[11] Patent Number: 5,856,875
[45] Date of Patent: Jan. 5, 1999

[54] APPARATUS AND METHOD FOR ALIGNING MACHINE PLATENS

[75] Inventors: David H. Duey, Westland; John A. Battista, Northville, both of Mich.

[73] Assignee: Intra Corporation, Westland, Mich.

[21] Appl. No.: 631,622

[22] Filed: Apr. 10, 1996

Related U.S. Application Data

[63] Continuation of Ser. No. 286,342, Aug. 5, 1994, abandoned.

[51] Int. Cl.$^6$ ..................................................... G01B 11/26
[52] U.S. Cl. ............................................ 356/400; 33/286
[58] Field of Search ................................... 356/399–401, 356/244, 152, 141.3, 153, 373; 248/206.5, 507, 680; 359/903; 33/286, DIG. 21, 1, 293, 529, 533, 645, 655; 100/46, 99, 281; 425/169, 171

[56] References Cited

U.S. PATENT DOCUMENTS

| | | | |
|---|---|---|---|
| 2,692,527 | 10/1954 | Wetzel et al. | 356/399 |
| 2,861,501 | 11/1958 | Strelakos | 359/903 |
| 2,947,807 | 8/1960 | Schlage et al. | 248/206.5 |
| 5,148,232 | 9/1992 | Duey et al. | 356/153 |
| 5,507,097 | 4/1996 | Duey et al. | 33/286 |

*Primary Examiner*—K P Hantis
*Attorney, Agent, or Firm*—Alex Rhodes

[57] ABSTRACT

An apparatus and method for a precision alignment of parallel fixed and movable platens of a machine, including a laser emitter for transmitting a narrow collimated laser beam having a control surface which is orthogonal to an axis of the laser emitter; a target for receiving the laser beam and producing an output voltage which is proportional to the displacement of the laser beam from the center of the target, and a pair of adapters for rotatably mounting the laser emitter on a fixed platen and the target on a movable platen of a machine. The adapters have control surfaces which are precisely orthogonal to axes of rotation of the emitter and target and a stud for tightly pulling together the orthogonal control surfaces of the emitter and target against the control surfaces of the adapters. Voltages from the target are processed in an electronic console and displayed on a display unit in alphanumeric form.

14 Claims, 5 Drawing Sheets

APPARATUS AND METHOD FOR ALIGNING MACHINE PLATENS

This is a continuation of application Ser. No. 08/286,342 now abandoned filed on Aug. 5, 1994.

FIELD OF THE INVENTION

This invention relates to machine alignment and more particularly to a laser apparatus and method for the parallel alignment of movable and fixed machine platens.

BACKGROUND OF THE INVENTION

The operation of machines, such as molding machines and stamping presses, is dependent upon a precision alignment of a movable platen with a stationary platen. Platen misalignment can adversely affect product quality, increase manufacturing costs, increase warranty costs and accelerate machine wear.

Platen misalignment can also require secondary machining operations to meet part tolerances. Where parts are functional, misalignment can result in product recalls and injure a manufacturer's reputation.

Current alignment practices rely on optical and mechanical instruments. Optical instruments, such as telescopes and interferometers are difficult to use, are time consuming and are highly dependent on worker skills. Mechanical instruments, such as dial indicators are time consuming and are affected by mechanical friction, temperature, and calibration errors.

Another deficiency with mechanical instruments is that they are difficult to use with machines having large spans between platens.

SUMMARY OF THE INVENTION

The present invention provides a highly accurate, easy to use apparatus and method for the parallel alignment of a fixed platen with a movable platen. One benefit of the invention is that time is reduced for aligning machine platens.

Another benefit, in addition to the foregoing benefit, is that accuracy is increased in the alignment of a machine platen.

Another benefit, in addition to the foregoing benefits, is that secondary manufacturing operations required by platen misalignment are eliminated.

Another benefit, in addition to the foregoing benefits, is that dependency on operator skill for platen alignment is reduced.

Another benefit, in addition to the foregoing benefits, is that the apparatus and method are applicable to machines with large spans between platens.

Another benefit, in addition to the foregoing benefits, is that the apparatus and method can be used for measuring parallelism, squareness, and closing motions of machine platens.

The apparatus broadly comprises a laser emitter, a photocell target, a pair of precision adapters for mounting the emitter and target on a machine, an electronic console for processing output voltages received from the target, and a display unit for displaying in alpha numeric form the output of the electronic console. The precision adapters, which themselves are believed to be novel, are an important feature of the present invention.

Further benefits and features of the invention will become apparent from the ensuing detailed description and drawings which discloses the invention and the property in which exclusive rights are claimed is set forth in each of the numbered claims at the conclusion of the detailed description.

DETAILED DESCRIPTION OF THE PREFERRED EMBODIMENT

Figure 1:
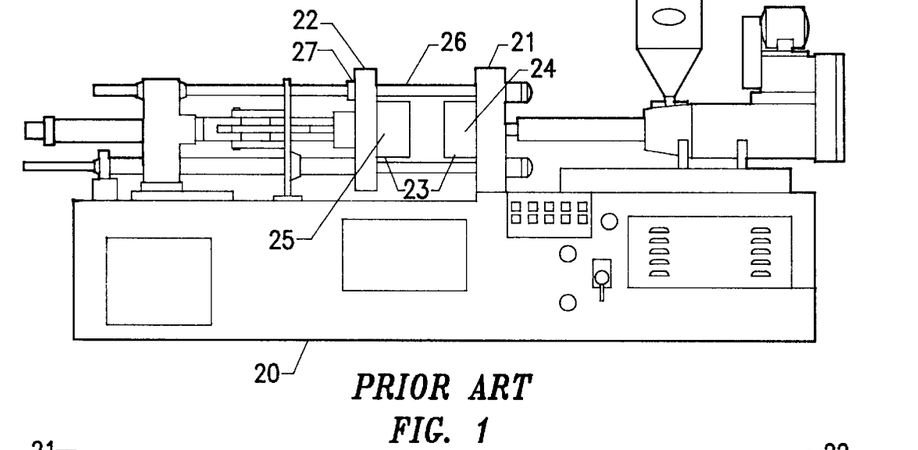
FIG. 1 is a front elevational view of a conventional plastic injection molding machine having stationary and movable platens.
Figures 2, 3:
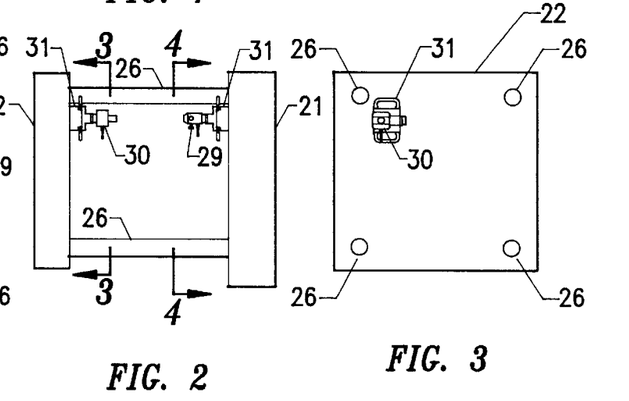
FIG. 2 is a front elevational view drawn to an enlarged scale of the platens of the machine shown in FIG. 1 together with a laser emitter, a photocell target and a pair of mounting fixtures mounted on the platens according to the present invention.
FIG. 3 is a cross-sectional view taken on the line 2—2 in FIG. 2.
Figure 4:
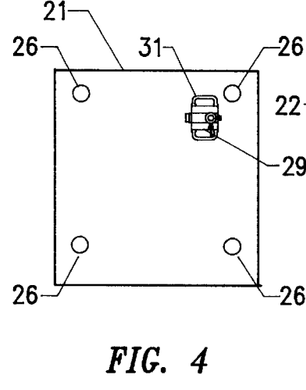
FIG. 4, is a cross-sectional view taken on the line 4—4 in FIG. 2.
Figure 5:
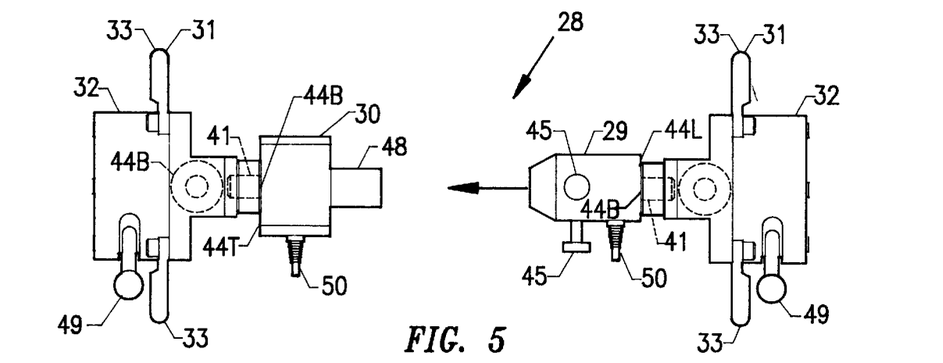
FIG. 5 is an enlarged view of the laser emitter, target and adapters shown in FIG. 2.
Figure 6:
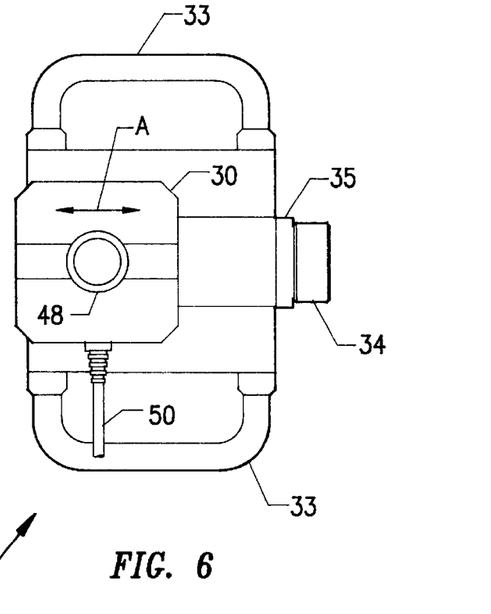
FIG. 6 is a portion of FIG. 3 showing the target and its adapter drawn to an enlarged scale.

Referring now to the drawings wherein like numerals designate like and corresponding parts throughout the several views, a conventional injection molding machine 20 for producing plastic parts is shown in FIG. 1.

The machine has a stationary platen 21 and a movable platen 22 directly opposite the stationary platen 21. Mounted on the stationary and movable platens 21, 22 is a mold 23 for producing a plastic part. Liquid plastic under pressure is injected into a cavity of the mold 23 for forming a plastic part. The mold 23 is divided into two portions. One portion of the mold 23, referred to as the "cover half" 24 is mounted on the stationary platen 21. The other portion of the mold 23, referred to as the "ejector half" 25, is mounted on the movable platen 22. A portion of the cavity (not shown)

which forms the part is in the cover half 24 and another portion is in the ejector half 25. When the mold 23 is closed, the common surface between the ejector and cover is commonly called the "parting line".

The fixed and movable platens 21, 22 are related to each other by cylindrical tie bars 26 which are attached to the fixed platen 21. At the corners of the movable platen 22 are bushings 27 which guide the movable platen 22.

When the mold 23 is closed, liquid plastic is injected under pressure into the cavity of the mold 23. After the cavity is filled and the plastic has solidified, the movable platen 22 is moved on the tie bars 26 away from the fixed platen 21 to open the mold 23.

During the opening of the mold 23, the finished part is held in the ejector half 25 until the part contacts stationary ejector pins (not shown) which strip the finished part from the ejector half 25 of the mold 23.

If the fixed platen 21 and movable platen 22 are misaligned, the mold 23 may not completely close and/or excessive friction may occur in the tie bar bushings 27. Liquid plastic will flow through a gap between the cover 24 and ejector 25 halves, producing flash which will need to be trimmed from the finished part. Moreover, part accuracy, particularly across the parting line and appearance will be adversely affected and excessive wear will occur in the tie bars 26 and bushings 27. Continued wear of the bushings 27 and/or tie bars 26 will result in further deterioration in part quality and appearance.

Referring now to FIGS. 2 through 16, inclusive, an apparatus 28 is illustrated for aligning the fixed 21 and movable 22 platens according to the invention.

A laser projector 29 and a photocell target 30 are attached to the platens 21, 22 by identical magnetic adapters 31, which is an important feature of the invention. The construction of the adapter 31 is illustrated in FIGS. 12 through 15, inclusive. The magnetic adapter 31 is comprised of a magnetic base 32, a pair of handles 33 mounted on opposite sides of the base 32, a pair of collar type bushings 34 for rotatably mounting the laser emitter 29 and target 30 in two optional orthogonal locations in the base 32. The collar bushings 34 are held in the base 32 by sleeves 35 and retaining plates 36.

Figure 15:
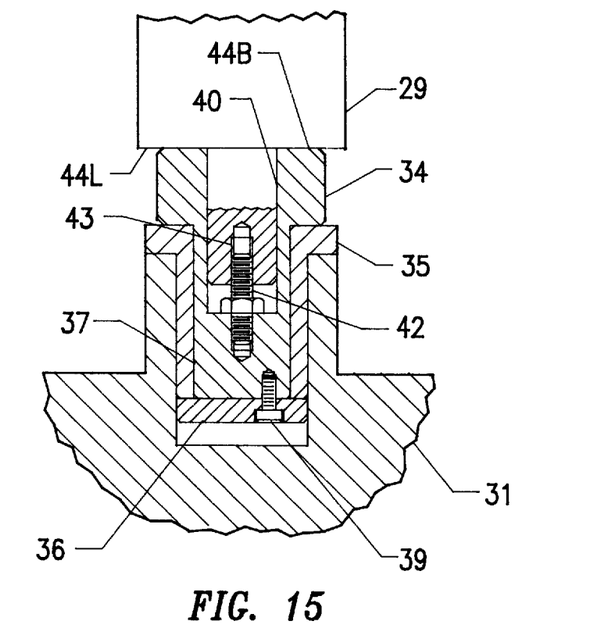
FIG. 15 is a cross-sectional view taken on the line 15—15 in FIG. 12.

The construction of the adapter 31 is best understood by reference to FIG. 15. At each of the orthogonal mounting locations there is an aperture 37. In the aperture 37 there is the close fitting sleeve 35 which is attached to the base 32 with threaded fasteners 38. The collar bushing 34 is mounted for rotation in the sleeve 35. The lower end of the collar bushing 34 is held in the sleeve 35 by the circular retaining plate 36. The circular plate 36 is attached to an inner end of the collar bushing 34 with threaded fasteners 39.

In the center of the collar bushing 34 there is an aperture 40 which receives a cylindrical mounting post 41 of the laser emitter 29 or photocell target 30. In the aperture 40 of the collar bushing 34 there is a stud 42 which threadably engages a tapped hole 43 in the end of the mounting post 41 of the laser emitter 29 or target 30. The purpose of the stud 42 is to tightly "pull down" control faces 44L, 44T of the laser emitter 29 or target 30 against the control faces 44B of the collar bushings 34.

It will be appreciated that with this arrangement, it is possible to achieve a much higher accuracy for aligning the platens than arrangements which rely on the accuracy of a diametral fit and the squareness of a mounting post with a base.

During an alignment, the beam from the emitter 29 enters the target 30 and generates voltages which are proportional to the lateral displacement of the beam from the center of the target.

The laser emitter 29 is preferably a low power semiconductor laser emitter 29 which emits a visual collimated beam. One such emitter 29 is manufactured by Intra Corporation of Westland, Mich., as part of the Intra Quadra Beam machine alignment system. The Quadra Beam laser is an FDA Class 2 semi-conductor laser which emits a narrow collimated red beam. A visual beam is preferred for rough aligning the laser beam with the target. At one end of the laser emitter 29 is the cylindrical post 41. Two adjusting screws 45 are provided on the emitter 29 housing for controlling the squareness of the laser beam with control face 44L of the emitter 29.

One feature of the Quadra Beam alignment system is that an electronic console 47 provides step by step instructions for aligning the movable 22 and fixed 21 platens. The Quadra Beam photocell target 30 is a lateral displacement target 30 which produces output voltages when struck by a laser beam. The output voltages from the target 30 are processed by the electronic console 47 ECU to measure the misalignment of the movable platen 22 with respect to the fixed platen 21.

As previously noted, the cylindrical mounting posts 41 at the ends of the emitter 29 and target 30 are preferably identical to allow the use of common adapters 31. The mounting posts 41 of the Intra laser emitter 29 and target 30 are detachable whereby other posts can be substituted for other applications.

Figure 7:
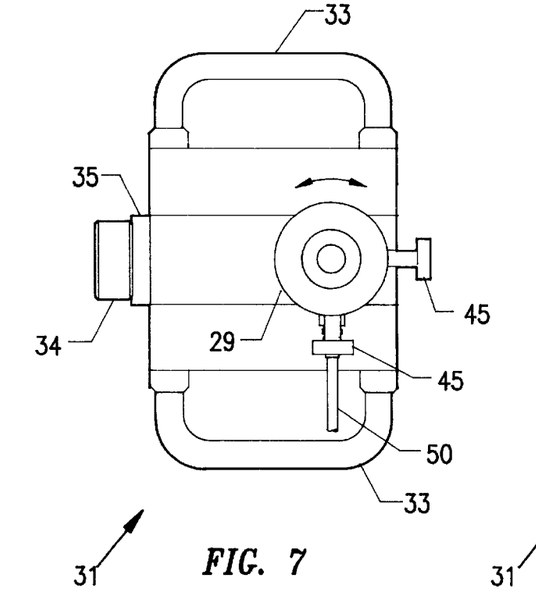
FIG. 7 is a portion of FIG. 4 showing the laser emitter and adapter drawn to an enlarged scale.
Figure 8:
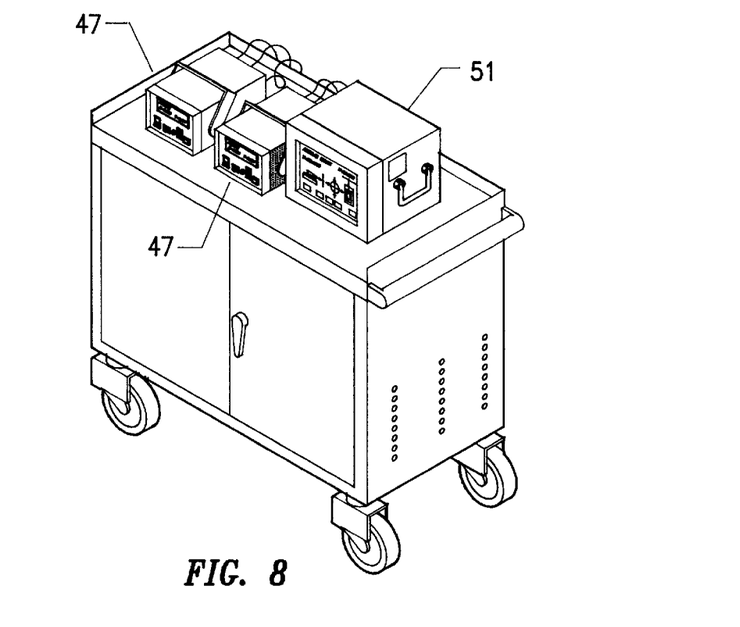
FIG. 8 is a perspective view of a cart, a pair of electronic consoles for processing signals from a pair of photocell targets and a video display unit for processing voltages and displaying angular and linear measurements taken with the instant invention.

At the opposite end of the target 30 a telescope 48 is slidably mounted on the target 30 for movement in the direction designated by the arrows "A" in FIG. 7. Although the mounting posts 41 are closely fitted to the apertures of the adapter bushings 40, as previously noted, the orthogonal control faces 44 and 44T of the emitter 29 and target 30 serve as control surfaces for aligning the fixed 21 and movable 22 platens.

With reference to FIGS. 2 through 8, inclusive, the fixed 21 and movable 22 platens are aligned as follows.

The initial step consists of angularly aligning the beam of laser emitter 29 with the fixed platen 21. The magnetic adapter 31 is mounted on the fixed platen 21, by rotating a lever 49, in close proximity to a tie bar 26. The laser emitter 29 is mounted in the magnetic adapter 31 by engaging the emitter's mounting post 41 with the "pull down" stud 42 of the adapter collar bushing.

The emitter 29 is connected to the electronic console 47 and rotated to a "zero" position by rotating the emitter 29 to position a wiring harness 50 on the emitter 29 at a 6 o'clock position (note: wiring harnesses 50 are used as references to indicate the zero positions of the emitter 29 and target 30).

The photocell target 30 is mounted in a similar manner in a magnetic adapter 31 which is attached to the movable platen 22 and connected to the electronic console 47 (note: the console 47 supplies power to the emitter 29 and target 30). With the telescope 48 on the center of the target 30, the target 30 is rough aligned with the laser emitter 29, using the visible laser beam. The target 30 is then rotated to position the target at a zero position (i.e. with its wiring harness 50 at a 6 o'clock position). It is important to note that during rotations of the emitter 29 and target 30, the control faces 44 of the emitter 29 and target 30 are held in close contact with the adapter control faces 44B.

The laser emitter 29 is then rotated 180 degrees and the resulting output voltage is transmitted by the operator to the electronic console 47 (ECU) where it is processed and stored. Thereafter, the emitter 29 is rotated 180 degrees to the "start position and the output voltage transmitted to the electronic console 47. The electronic console 47 calculates the angular misalignment of the laser emitter beam and fixed platen 21 and displays the results in terms of horizontal ("X") and vertical ("Y") components and displays the results on the display units.

The laser beam is then angularly adjusted to square the beam with the fixed platen 21. This is done by adjusting the external adjustment screws 45 to zero the "X" and "Y" readings on the display unit 51.

The next step consists of determining the displacement of the laser beam from the center of the target 30. The telescope 48 is moved off of the center of the target 30 and the output voltage is transmitted by the operator to the electronic console 47 where it is processed to determine the displacement of the beam from the center of the target 30.

Finally, the angular alignment of the fixed platen 21 is determined by the following steps. With the telescope 48 centered on the target 30, the target 30 is rotated 180 degrees from the zero position and the output voltage is transmitted by the operator to the electronic console 47 where it is processed and stored. The target 30 is then returned to the zero position whereat the target output voltages are transmitted to the electronic console 47, processed and displayed in terms of "X" and "Y" displacements on the display unit 51.

Figure 16:
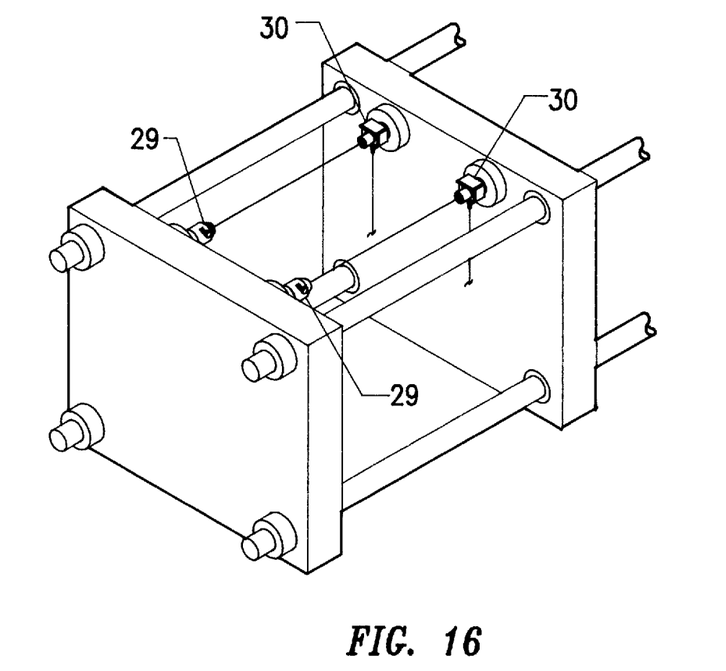
FIG. 16 is a perspective view drawn to an enlarged scale of the fixed and movable platens and a pair of laser emitters and targets mounted on the platens.

When the platens are very large, it is preferable to make these measurements in two places, using a pair of laser emitters and targets, as shown in FIG. 16.

Figure 9:
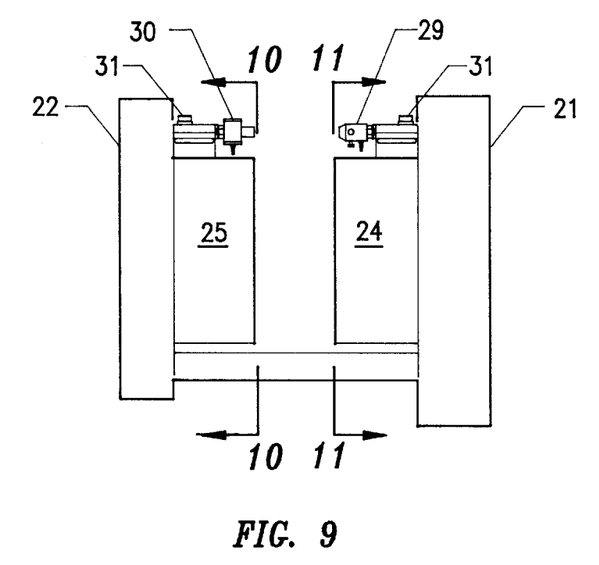
FIG. 9 is a front view drawn to an enlarged scale of the laser emitter, target and adapters of FIGS. 2 through 8 top surfaces on the cover and ejector halves of the mold shown in FIG. 1.
Figure 10:
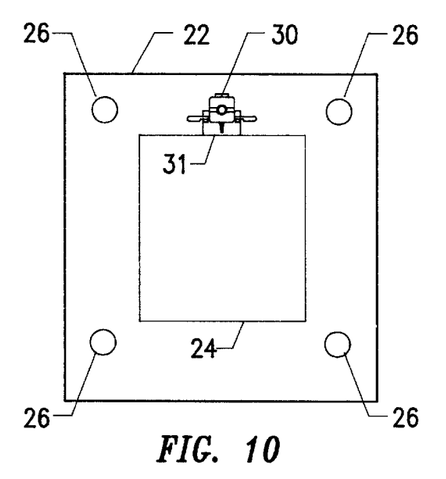
FIG. 10 is a cross-sectional view taken on the line 10—10 in FIG. 9.
Figure 11:
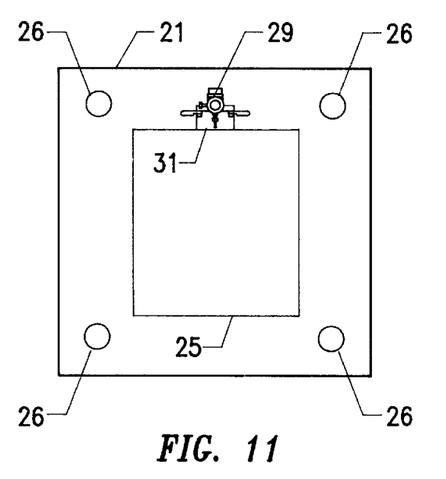
FIG. 11 is a cross-sectional view taken on the line 11—11 in FIG. 9.
Figure 12:
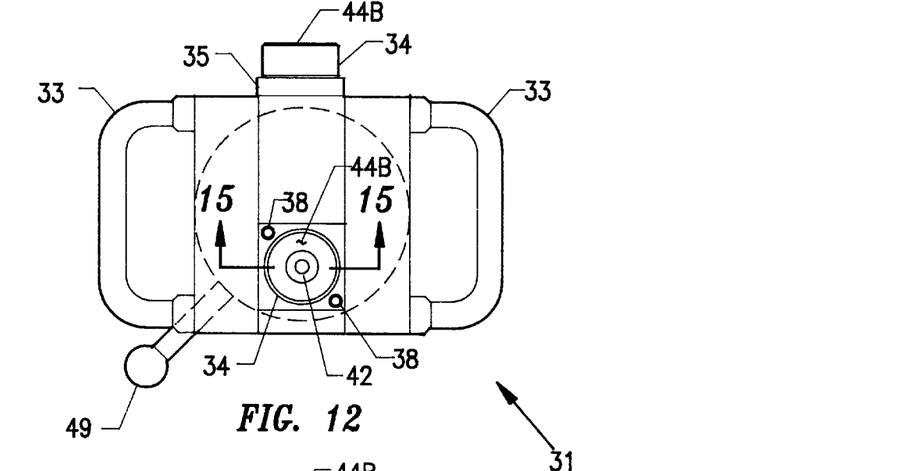
FIG. 12 is a front view drawn to an enlarged scale of one of the adapters.
Figure 13:
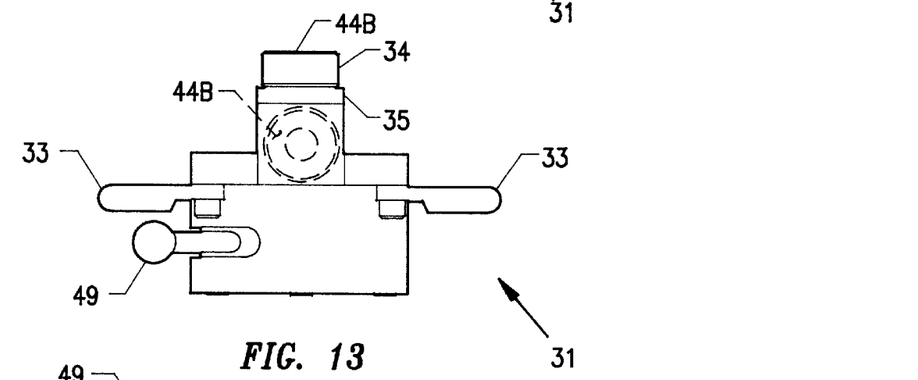
FIG. 13 is a side view of the adapter shown in FIG. 12.
Figure 14:
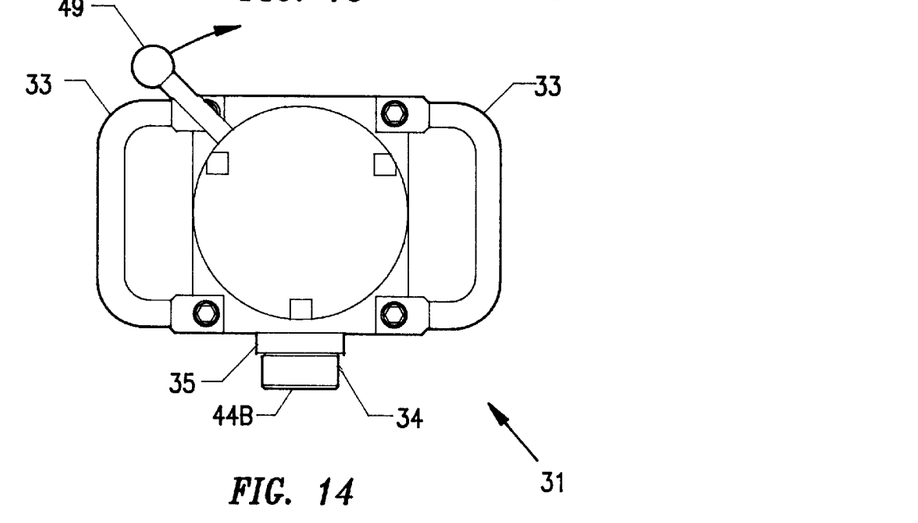
FIG. 14 is a rear view of the adapter shown in FIG. 12.

In addition to insuring that the platens are parallel, it is important that the guides, support and the actuating mechanisms of the movable platen are adjusted so that the travel of the movable platen, through its operating range, is straight, square, and parallel relative to the stationary platen. If the travel deviates excessively from a true path, damage to the equipment will occur and part quality will be poor. The travel of the movable platen with respect to the fixed platen can also be evaluated and corrective actions taken with the cover and ejector halves of the mold, as shown in FIGS. 9 through 10.

From the foregoing it will be appreciated that our invention provides an efficient, easy to use, highly accurate apparatus and method for aligning a fixed platen with a movable platen.

Although but a single embodiment of our invention has been disclosed it is not our intention to limit the scope of our invention to this embodiment since other embodiments can be developed by changes in materials, size, arrangement, number and shapes of parts without departing from the spirit thereof.

We claim:

1. An apparatus for accurately aligning a surface of a fixed platen in parallel relationship with the surface of a movable platen of a machine comprising: a laser emitter for projecting a narrow collimated laser beam, said emitter having a control surface which is substantially orthogonal to an axis of rotation of said laser emitter; a first adapter for mounting said laser emitter on a surface of a fixed platen of a machine, said first adapter having a member mounted for rotation in said first adapter, said rotatable member having a control surface which is substantially parallel to said control surface of said laser emitter; a means for tightly pulling together said control surfaces of said laser emitter and said first adapter; a target for producing a voltage when struck by said laser beam which is indicative of a position of said laser beam with respect to said target, said target having a control surface which is substantially orthogonal to an axis of rotation of said target; a second adapter for mounting said target on a surface of a movable platen of a machine which is to be aligned in parallel relationship to said surface of said fixed platen of said machine, said second adapter having a member mounted for rotation in said second adapter, said rotatable member having a control surface which is substantially parallel to said control surface of said target; and a means for tightly pulling together said control surfaces of said target and said second adapter.

2. The laser alignment apparatus recited in claim 1 further comprising an electronic means for indicating said position of said laser beam with respect to said target.

3. The laser alignment apparatus recited in claim 2 wherein said electronic means comprises a display unit for visually displaying in alphanumeric form a displacement of said laser beam from a center of said target.

4. The laser alignment apparatus recited in claim 1 wherein said laser emitter transmits a visible light laser beam for rough aligning said laser beam with said target.

5. The laser alignment apparatus recited in claim 1 wherein each of said adapters includes a magnetic means for mounting said adapters on said surfaces of said fixed and movable platens of said machine.

6. The laser alignment apparatus recited in claim 1 wherein said target includes a means for laterally and angularly aligning said laser beam with said target.

7. An apparatus for accurately aligning a surface of a fixed platen in parallel relationship with the surface of a movable platen of a machine comprising: a laser emitter for projecting a narrow collimated laser beam, said emitter having a control surface which is substantially orthogonal to an axis of rotation of said laser emitter; a first adapter for mounting said laser emitter on a surface of a fixed platen of a machine, said first adapter having a member mounted for rotation in said first adapter, said rotatable member having a control surface which is substantially parallel to said control surface of said laser emitter; a means for tightly pulling together said control surfaces of said laser emitter and said first adapter by threadably engaging said emitter with said first adapter; a target for producing a voltage when struck by said laser beam which is indicative of a position of said laser beam with respect to said target, said target having a control surface which is substantially orthogonal to an axis of rotation of said target; a second adapter for mounting said target on a surface of a movable platen of a machine which is to be aligned in parallel relationship to said surface of said fixed platen of said machine, said second adapter having a member mounted for rotation in said second adapter, said rotatable member having a control surface which is substantially parallel to said control surface of said target; and a means for threadably engaging said target and said second adapter to tightly pull together said control surfaces of said target and said second adapter.

8. The laser alignment apparatus recited in claim 7 further comprising a means for magnetically mounting said first adapter on said fixed platen and a means for mounting said second adapter on said movable platen.

9. In combination with a machine of the type wherein a planar surface of a movable platen is moved toward and away from an opposing planar surface of a fixed platen, a method for improving the accuracy of said machine by accurately aligning in parallel relationship said opposing planar surfaces of said platens comprising the steps of: mounting a first adapter on said planar surface of said fixed platen, said first adapter having a planar control surface which is in spaced apart relationship with said planar surface of said fixed platen; mounting for rotation a laser emitter in said first adapter, said laser emitter having a planar control surface which is substantially orthogonal to an axis of rotation of said laser emitter; pulling together said planar control surfaces of said laser emitter and said first adapter such that an axis of rotation of said laser emitter is directed toward said planar surface of said movable platen; mounting a second adapter on said planar surface of said movable platen, said second adapter having a planar control surface which is in spaced apart relationship with said planar surface of said movable platen; mounting for rotation a photocell target in said second adapter, said photocell target having a planar control surface which is substantially orthogonal to an axis of rotation of said photocell target; pulling together said control surfaces of said photocell target and said second adapter such that said axis of rotation of said target is directed toward said planar surface of said fixed platen; projecting a laser beam along said axis of said laser emitter toward said target; and aligning said laser beam with said axis of said target.

10. The combination as recited in claim 9 further comprising the step of rough aligning said laser emitter with said target after said laser emitter and said target are mounted on said platens by transmitting a visible light laser beam to said target.

11. The combination as recited in claim 9 wherein said first adapter is magnetically mounted on said fixed platen of said machine.

12. The combination as recited in claim 9 wherein said first adapter is magnetically mounted on said fixed platen and said second adapter is magnetically mounted on said movable platen of said machine.

13. In combination with a machine of the type wherein a planar surface of a movable platen is moved toward and away from an opposing planar surface of a fixed platen, a method for improving the accuracy of said machine by accurately aligning in parallel relationship said opposing planar surfaces of said platens comprising the steps of: mounting at least one adapter on one of said platens of said machine, said adapter having a planar control surface spaced apart from said planar surface of said platen; mounting for rotation a laser emitter in said adapter, said laser emitter having a planar control surface which is substantially orthogonal to an axis of rotation of said laser emitter; pulling together said planar control surfaces of said laser emitter and said adapter such that said axis of rotation of said laser emitter is directed toward said opposing planar surface of said other platen; mounting a second adapter on said opposing planar surface of said other platen, said second adapter having a planar control surface in spaced apart relationship with said opposing planar surface of said other platen; mounting for rotation a photocell target in said second adapter, said target having a planar control surface which is substantially orthogonal to said axis of said target; pulling together said planar control surfaces of said target and said second adapter such that said axis of rotation of said target is directed toward said other of said platens; projecting a laser beam along said axis of said laser emitter toward said target; and aligning said beam of said laser emitter with said axis of said target.

14. The combination as recited in claim 13 wherein said adapters are identical.

* * * * *

UNITED STATES PATENT AND TRADEMARK OFFICE
CERTIFICATE OF CORRECTION

PATENT NO.   : 5,856,875
DATED        : January 5, 1999
INVENTOR(S)  : David H. Duey & John A. Battista It is certified that error appears in the above-indentified patent and that said Letters Patent is hereby corrected as shown below:

```
column 2, line 33, after "through 8" insert
    --mounted on-- column 2, line 34, after "surfaces" change "on"
    to --of-- column 4, line 34, after "faces" change "44"
    to --44L--
```

Signed and Sealed this

Fourth Day of May, 1999

Attest:

Q. TODD DICKINSON

Attesting Officer

Acting Commissioner of Patents and Trademarks